(12) United States Patent
Cui et al.

(10) Patent No.: US 11,868,182 B2
(45) Date of Patent: Jan. 9, 2024

(54) DISPLAY DEVICE

(71) Applicant: BOE TECHNOLOGY GROUP CO., LTD., Beijing (CN)

(72) Inventors: Yue Cui, Beijing (CN); Boyang Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 23 days.

(21) Appl. No.: 17/615,185

(22) PCT Filed: Dec. 10, 2020

(86) PCT No.: PCT/CN2020/135247
§ 371 (c)(1),
(2) Date: Nov. 30, 2021

(87) PCT Pub. No.: WO2022/120711
PCT Pub. Date: Jun. 16, 2022

(65) Prior Publication Data
US 2022/0365561 A1 Nov. 17, 2022

(51) Int. Cl.
*G06F 1/16* (2006.01)
(52) U.S. Cl.
CPC .......... *G06F 1/1652* (2013.01); *G06F 1/1618* (2013.01); *G06F 1/1656* (2013.01); *G06F 1/1681* (2013.01)
(58) Field of Classification Search
CPC .... G06F 1/1652; G06F 1/1618; G06F 1/1656; G06F 1/1681; G06F 3/041; G09F 9/30
See application file for complete search history.

(56) References Cited

U.S. PATENT DOCUMENTS 9,348,450 B1 * 5/2016 Kim .................... H04M 1/0268
9,857,832 B2 1/2018 Kim
(Continued)

FOREIGN PATENT DOCUMENTS

CN 107665063 A 2/2018
CN 110580860 A 12/2019
(Continued)

OTHER PUBLICATIONS

Written Opinion for PCT Patent Application No. PCT/CN2020/135247 dated Aug. 26, 2021.

*Primary Examiner* — Rockshana D Chowdhury
(74) *Attorney, Agent, or Firm* — Perilla Knox & Hildebrandt LLP; Kenneth A. Knox

(57) ABSTRACT

The present disclosure relates a display device including a first support member, a second member and a flexible display module. The second support member has a gap with the first support member. The flexible display module is arranged on a first surface of the first support member and a third surface of the second support member. The first surface includes a first mating surface close, the third surface includes a third mating surface, and the first and third mating surfaces are arranged symmetrically. A distance from the first mating surface to the flexible display module increases as a distance from the first mating surface to the second support member decreases, and a distance from the third mating surface to the flexible display module increases as a distance from the third mating surface to the first support member decreases.

14 Claims, 6 Drawing Sheets

(56) References Cited

U.S. PATENT DOCUMENTS

| | | | |
|---|---|---|---|
| 10,209,746 B2 * | 2/2019 | Baek | G06F 1/1675 |
| 10,495,941 B2 * | 12/2019 | Hashimoto | G06F 1/1643 |
| 10,817,030 B2 * | 10/2020 | Pelissier | G06F 1/1641 |
| 10,912,214 B2 * | 2/2021 | Kang | H05K 5/03 |
| 11,455,914 B2 * | 9/2022 | Yoon | G06F 1/1641 |
| 11,474,570 B2 * | 10/2022 | Lee | G06F 1/1652 |
| 2013/0021762 A1 * | 1/2013 | van Dijk | H04M 1/022 361/749 |
| 2016/0150657 A1 * | 5/2016 | Myeong | G06F 1/1652 361/749 |
| 2016/0378203 A1 | 12/2016 | Kim | |
| 2020/0137907 A1 * | 4/2020 | Kang | H05K 5/0017 |

FOREIGN PATENT DOCUMENTS

| | | |
|---|---|---|
| CN | 110853510 A | 2/2020 |
| CN | 110956899 A | 4/2020 |
| CN | 111352536 A | 6/2020 |
| CN | 210926021 U | 7/2020 |
| CN | 111613134 A | 9/2020 |
| CN | 111882993 A | 11/2020 |
| CN | 110853510 B | 12/2020 |
| CN | 212208239 U | 12/2020 |
| WO | 2016208857 A1 | 12/2016 |

* cited by examiner

DISPLAY DEVICE

CROSS-REFERENCE TO RELATED APPLICATION

The present application is based upon International Application No. PCT/CN2020/135247 filed on Dec. 10, 2020, the entire contents of which are incorporated herein by reference.

TECHNICAL FIELD

The present disclosure relates to the field of display technology, and particularly, to a display device.

BACKGROUND

With the development of technology, a foldable flexible display device has entered the lives of ordinary consumers. Outward folding means that a display side of the display device faces outward when the display device is in a folding state. Outward folding may provide users with more convenient services. However, the outward display side requires a flexible display module to have a high scratch resistance and impact resistance. Inward folding means that a main display panel is on the inside when in a folding state, which may prevent defects, such as scratches on the flexible display module, however, an additional secondary screen on the outside for quick use is required.

At present, the foldable flexible display device may only realize the outward folding or the inward folding, and no display device can satisfy both the inward folding and the outward folding.

It should be noted that the invention information in the background section above is only used to enhance the understanding of the background of the present disclosure, and therefore may include information that does not constitute the prior art known to those skilled in the art.

SUMMARY

The present disclosure provides a display device.

An aspect of the present disclosure provides a display device, including:
  a first support member, having a first surface and a second surface that are arranged oppositely;
  a second support member, having a gap with the first support member, and having a third surface and a fourth surface that are arranged oppositely; and
  a flexible display module, arranged on the first surface of the first support member and the third surface of the second support member,
  wherein the first surface includes a first mating surface close to the second support member, the third surface includes a third mating surface close to the first support member, and the first mating surface and the third mating surface are arranged symmetrically to each other; and
  a distance from at least part of the first mating surface to the flexible display module increases as a distance from the at least part of the first mating surface to the second support member decreases, and a distance from at least part of the third mating surface to the flexible display module increases as a distance from the at least part of the third mating surface to the first support member decreases, so that when the display device is folded inward, the flexible display module contacts with the at least part of the first mating surface and the at least part of the third mating surface to form a water-drop shape.

In an exemplary embodiment of the present disclosure, the first mating surface and the third mating surface each includes:
  a bonding plane, on which the flexible display module is bonded;
  an inclined surface, connected with the bonding plane and having a smooth transition with the bonding plane; and
  a limiting plane, connected with the inclined surface and arranged in parallel with the bonding plane,
  wherein the inclined surface is inclined from the bonding plane to the limiting plane to a side away from the flexible display module, the inclined surface transitions to the limiting plane through at least one curved surface protruding to the flexible display module, and the inclined surface is coplanar with a tangent plane of the curved surface, so that when the display device is folded inward, the flexible display module contacts the curved surface and the limiting plane to form the water-drop shape.

In an exemplary embodiment of the present disclosure, an inclination angle of the inclined surface is greater than or equal to 10 degrees and less than or equal to 20 degrees, a width of the limiting plane is greater than or equal to 5 mm and less than or equal to 7 mm, and a sum of the width of the limiting plane and a width of the inclined surface is greater than or equal to 13 mm and less than or equal to 15 mm.

In an exemplary embodiment of the present disclosure, the flexible display module includes:
  a flexible support plate, bonded to a part of the first surface and a part of the third surface;
  a protective layer, arranged on a side of the flexible support plate away from the first support member and the second support member;
  a backsheet layer, arranged on a side of the protective layer away from the flexible support plate;
  a first adhesive layer, arranged on a side of the backsheet layer away from the flexible support plate;
  a flexible display panel, arranged on a side of the first adhesive layer away from the flexible support plate;
  a second adhesive layer, arranged on a side of the flexible display panel away from the flexible support plate;
  a polarizer, arranged on a side of the second adhesive layer away from the flexible support plate;
  a third adhesive layer, arranged on a side of the polarizer away from the flexible support plate; and
  a first cover plate, arranged on a side of the third adhesive layer away from the flexible support plate.

In an exemplary embodiment of the present disclosure, a thickness of the flexible support plate is greater than or equal to 140 μm and less than or equal to 160 μm, and an equivalent elastic modulus of the flexible support plate is greater than or equal to 8 Kpa and less than or equal to 12 Kpa.

In an exemplary embodiment of the present disclosure, a material of the first adhesive layer is OCA optical adhesive, a thickness of the first adhesive layer is greater than or equal to 12 μm and less than or equal to 18 μm, and an elastic modulus of the first adhesive layer is greater than or equal to 35 KPa and less than or equal to 55 Kpa at a temperature of 25° C., greater than or equal to 120 KPa and less than or equal to 140 Kpa at a temperature of −20° C., and greater than or equal to 35 KPa and less than or equal to 45 KPa at a temperature of 60° C.

In an exemplary embodiment of the present disclosure, a material of the second adhesive layer is the OCA optical adhesive, a thickness of the second adhesive layer is greater than or equal to 10 μm and less than or equal to 20 μm, and an elastic modulus of the second adhesive layer is greater than or equal to 70 KPa and less than or equal to 90 Kpa at a temperature of 25° C., greater than or equal to 120 KPa and less than or equal to 140 Kpa at a temperature of −20° C., and greater than or equal to 60 KPa and less than or equal to 80 KPa at a temperature of 65° C.

In an exemplary embodiment of the present disclosure, a thickness of the first cover plate is greater than or equal to 80 μm and less than or equal to 90 μm.

In an exemplary embodiment of the present disclosure, a thickness of the polarizer is greater than or equal to 40 μm and less than or equal to 50 μm, and an elastic modulus of the polarizer is greater than or equal to 2.7 GPa and less than or equal to 3.7 GPa.

In an exemplary embodiment of the present disclosure, a thickness of the backsheet layer is greater than or equal to 20 μm and less than or equal to 26 μm, and an elastic modulus of the backsheet layer is greater than or equal to 2.7 GPa and less than or equal to 3.7 GPa.

In an exemplary embodiment of the present disclosure, a material of the third adhesive layer is the OCA optical adhesive, a curing rate of the third adhesive layer is greater than or equal to 65% and less than or equal to 71%, a thickness of the third adhesive layer is greater than or equal to 45 μm and less than or equal to 55 μm, and an elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.; or the material of the third adhesive layer is the OCA optical adhesive, the curing rate of the third adhesive layer is greater than or equal to 65% and less than or equal to 71%, the thickness of the third adhesive layer is greater than or equal to 90 μm and less than or equal to 110 μm, and the elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.; or the material of the third adhesive layer is the OCA optical adhesive, the curing rate of the third adhesive layer is greater than or equal to 65% and less than or equal to 71%, the thickness of the third adhesive layer is greater than or equal to 45 μm and less than or equal to 55 μm, and the elastic modulus of the third adhesive layer is greater than or equal to 130 KPa and less than or equal to 150 KPa at a temperature of 25° C.

In an exemplary embodiment of the present disclosure, a thickness of the backsheet layer is greater than or equal to 20 μm and less than or equal to 26 μm, and an elastic modulus of the backsheet layer is greater than or equal to 8 GPa and less than or equal to 10 GPa; and a material of the third adhesive layer is the OCA optical adhesive, a curing rate of the third adhesive layer is greater than or equal to 65% and less than or equal to 71%, a thickness of the third adhesive layer is greater than or equal to 45 μm and less than or equal to 55 μm, and an elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.

In an exemplary embodiment of the present disclosure, a thickness of the polarizer is greater than or equal to 80 μm and less than or equal to 100 μm, and an elastic modulus of the polarizer is greater than or equal to 2.7 GPa and less than or equal to 3.7 GPa;

a thickness of the backsheet layer is greater than or equal to 20 μm and less than or equal to 26 μm, and an elastic modulus of the backsheet layer is greater than or equal to 2.7 GPa and less than or equal to 3.7 Gpa; and a material of the third adhesive layer is the OCA optical adhesive, a curing rate of the third adhesive layer is greater than or equal to 65% and less than or equal to 71%, a thickness of the third adhesive layer is greater than or equal to 45 μm and less than or equal to 55 μm, and an elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.

In an exemplary embodiment of the present disclosure, the flexible display module further includes:
 a fourth adhesive layer, arranged on a side of the first cover plate away from the flexible support plate; and
 a second cover plate, arranged on a side of the fourth adhesive layer away from the flexible support plate.

In an exemplary embodiment of the present disclosure, a thickness of the second cover plate is greater than or equal to 80 μm and less than or equal to 90 μm.

Other characteristics and advantages of the present disclosure will become apparent through the following detailed description, or partly learned through the practice of the present disclosure.

It should be understood that the above general description and the following detailed description are only exemplary and explanatory, and cannot limit the present disclosure.

BRIEF DESCRIPTION OF THE DRAWINGS

The above-mentioned and other features and advantages of the present disclosure will become more apparent by describing in detail the exemplary embodiments thereof with reference to the accompanying drawings.

DETAILED DESCRIPTION

Figure 1:
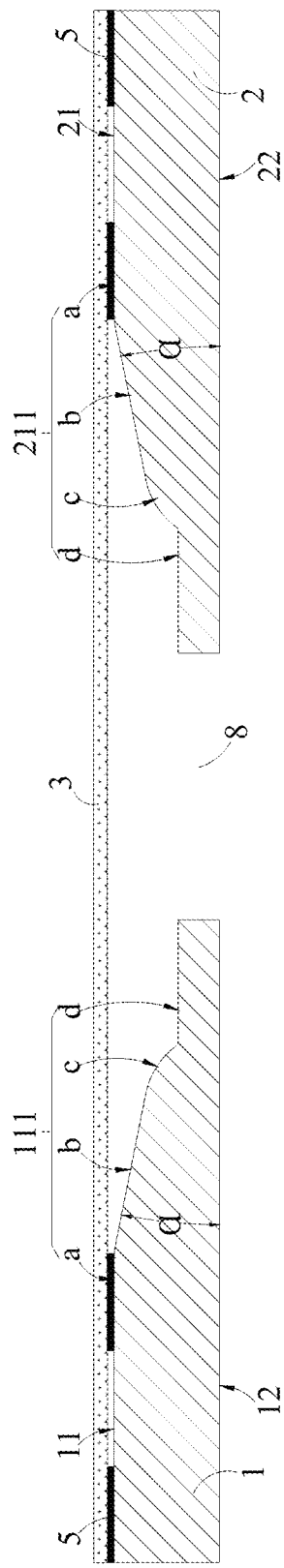
FIG. 1 is a schematic structural diagram of a display device according to an exemplary embodiment of the present invention.

Example embodiments will now be described more fully with reference to the accompanying drawings. However, the example embodiments may be implemented in various forms, and should not be construed as being limited to the embodiments set forth herein; on the contrary, these embodiments are provided so that the present disclosure will be comprehensive and complete, and the concept of the example embodiments is fully conveyed to those skilled in the art. The same reference numerals in the figures indicate the same or similar structures, and thus their detailed descriptions will be omitted.

When a foldable flexible display device is folded inward and outward, various film layers thereof are subjected to different forces. For example, the film layer that is subjected to a pressure when being folded inward may be subjected to a tension when being folded outward. In the case where the foldable flexible display device can be folded both inward and outward, the strain of each film layer is relatively large, especially when the foldable display device is folded inward. Generally, each film layer will have a maximum strain when the foldable display device is folded inward, so that an adhesive material fails, and a functional layer of the flexible display panel also fails due to the large strain, which causes the foldable flexible display device to fail to display normally.

Moreover, in the related art, a water-drop shape formed when the foldable flexible display device is folded inward is not smooth, and a corner will be formed, which will also cause the strain of each film layer to be large and cause the adhesive to fail, and the functional layer of the flexible display panel 35 will also fail due to the large strain, so that the foldable flexible display device cannot display normally.

Figure 2:
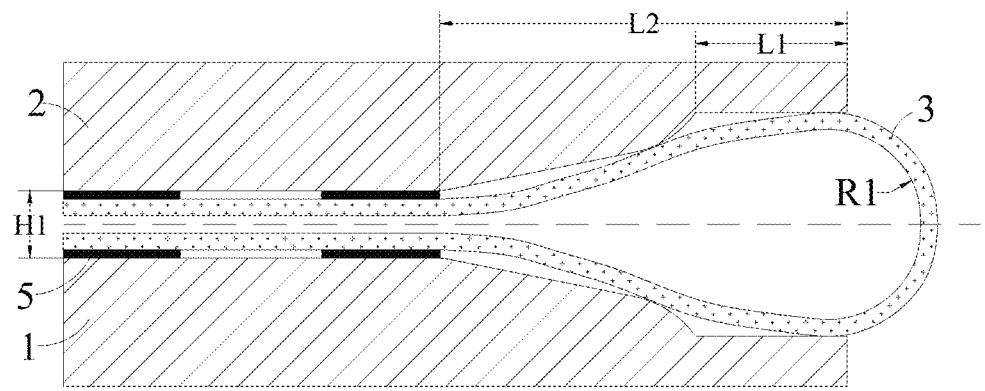
FIG. 2 is a schematic structural diagram of a display device in FIG. 1 in an inward folding state.
Figure 3:
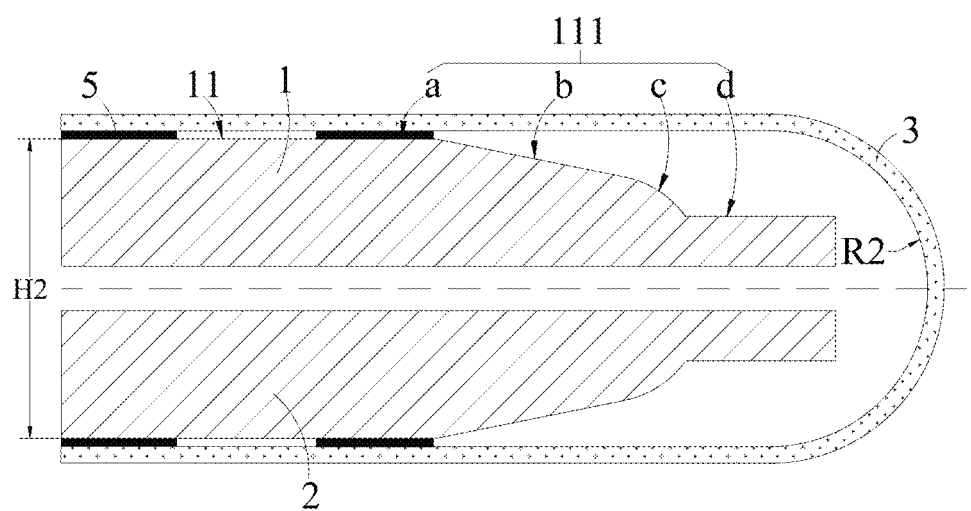
FIG. 3 is a schematic structural diagram of a display device in FIG. 1 in an outward folding state.

An exemplary embodiment provides a display device. Referring to FIGS. 1 to 3, which show schematic structural diagrams of a display device according to an exemplary embodiment of the present disclosure, the display device may include: a first support member 1, having a first surface 11 and a second surface 12 that are arranged oppositely; a second support member 2, having a gap 8 with the first support member 1, and having a third surface 21 and a fourth surface 22 that are arranged oppositely; and a flexible display module 3, arranged on the first surface 11 of the first support member 1 and the third surface 21 of the second support member 2. The first surface 11 includes a first mating surface 111 close to the second support member 2, the third surface 21 includes a third mating surface 211 close to the first support member 1, and the first mating surface 111 and the third mating surface 211 are arranged symmetrically to each other. A distance from at least part of the first mating surface 111 to the flexible display module 3 increases as a distance from the at least part of the first mating surface 111 to the second support member 2 decreases, and a distance from at least part of the third mating surface 211 to the flexible display module 3 increases as a distance from the at least part of the third mating surface 211 to the first support member 1 decreases, so that when the display device is folded inward, the flexible display module 3 contacts with the at least part of the first mating surface 111 and the at least part of the third mating surface 211 to form a water-drop shape.

In the display device of the exemplary embodiment, the distance from at least part of the first mating surface 111 to the flexible display module 3 increases as the distance from the at least part of the first mating surface 111 to the second support member 2 decreases, and the first mating surface 111 and the third mating surface 211 are arranged symmetrically to each other, that is, the distance from at least part of the third mating surface 211 to the flexible display module 3 increases as the distance from the at least part of the third mating surface 211 to the first support member 1 decreases, so that when the display device is folded inward, the flexible display module 3 contacts with at least part of the first mating surface 111 and at least part of the third mating surface 211 to form the water-drop shape. Due to the support of the first mating surface 111 and the third mating surface 211, the water-drop shape formed by the flexible display module 3 is relatively smooth and does not have a corner, which avoids a large stress of each film layer, thereby avoiding the failure of the adhesive material and the functional layer, and being suitable for the display device that can be folded both inward and outward.

In an exemplary embodiment, the "away from" and "close to" is referred in a state when the display device is in a flat state. A length direction is a direction perpendicular to a bending direction of the display device, and a width direction is a direction perpendicular to the length direction and parallel to the flexible display module 3.

In an exemplary embodiment, the first support member 1 has the first surface 11 and the second surface 12, and the first surface 11 and the second surface 12 are arranged opposite to each other. The second surface 12 may be a plane, and the flexible display module 3 may be arranged on the first surface 11. The second support member 2 has the third surface 21 and the fourth surface 22, and the third surface 21 and the fourth surface 22 are arranged opposite to each other. The fourth surface 22 may be a plane, and the flexible display module 3 may be arranged on the third surface 21.

The first support member 1 and the second support member 2 may have the same structure, the gap 8 is provided between the first support member 1 and the second support member 2, and the first support member 1 and the second support member 2 are symmetrically arranged, that is, the first surface 11 and the third surface 21 are symmetrical to each other.

Specifically, an area of the first surface 11 close to the second support member 2 is the first mating surface 111, and the first mating surface 111 may include a bonding plane a, an inclined surface b, and a limiting plane d. The bonding plane a is located at an end of the first mating surface 111 far away from the bending position, and the limiting plane d is located at an end of the first support member 1 close to the bending position. The limiting plane d is arranged parallel to the bonding plane a, and both the limiting plane d and the bonding plane a are parallel to the flexible display module 3. The flexible display module 3 is bonded on the bonding plane a through a bonding layer 5. In a flat state, there is a space between the limiting plane d and the flexible display module 3.

An area of the third surface 21 close to the first support member 1 is the third mating surface 211, and the third mating surface 211 may also include a bonding plane a, an inclined surface b, and a limiting plane d. The bonding plane a is located at an end of the third mating surface 211 far away from the bending position, and the limiting plane d is located at an end of the second support member 2 close to the bending position. The limiting plane d is arranged parallel to the bonding plane a, and both the limiting plane d and the bonding plane a are parallel to the flexible display module 3. The flexible display module 3 is bonded on the bonding plane a through the bonding layer 5. In the flat state, there is a space between the limiting plane d and the flexible display module 3.

The inclined surface b is connected between the bonding plane a and the limiting plane d. There is a smooth transition between the inclined surface b and the bonding plane a. The inclined surface b is inclined from the bonding plane a to the limiting plane d to a side away from the flexible display module 3, and an inclination angle α of the inclined surface b is about 15 degrees, that is, the angle α between the inclined surface b and the second surface 12 is approximately 15 degrees, and the angle α between the inclined surface b and the fourth surface 22 is approximately 15 degrees. Of course, the inclination angle α of the inclined surface b may be greater than or equal to 10 degrees and less than or equal to 20 degrees.

The inclined surface b transitions to the limiting plane d through an arc surface c protruding to the flexible display module 3, and the inclined surface b and a tangent plane of the arc surface c are coplanar with each other, that is, the arc surface c is connected between the inclined surface b and the limiting plane d, the arc surface c protrudes toward the flexible display module 3, the arc surface c is tangent to the inclined surface b, so that there is a smooth transition between the arc surface c and the inclined surface b. That is, the first support member 1 forms a partial cylinder at the arc surface c, and the tangent plane of the cylinder is a plane that passes through a generatrix of the cylinder and is perpendicular to the axis cross section passing the generatrix. In addition, in other exemplary embodiments of the present disclosure, the arc surface c connected between the inclined surface b and the limiting plane d may also be an elliptical arc surface c, a parabolic arc surface c and the like, as long as it can contact with the flexible display module 3 when the display device is folded inward to cause the flexible display module 3 to form a smooth water-drop shape.

In an exemplary embodiment, referring to FIG. 2, a width L1 of the limiting plane d is about 6 mm±1 mm. It should be noted that the width L1 of the limiting plane d is about 6 mm±1 mm, which means that the width L1 of the limiting plane d is greater than or equal to 5 mm (6 mm-1 mm) and less than or equal to 7 mm (6 mm±1 mm). Each data mentioned later represents an interval value, not a point value and corresponds to a numerical range in the claims. A sum L2 of the width of the inclined plane b and the width of the limiting plane d is approximately 14 mm±1 mm. After the display device is folded inward, a minimum distance H1 between the first support member 1 and the second support member 2 is about 2 mm, and an inward folded shape of a smooth water-drop shape with a radius R1 of about 3 mm is formed. Referring to FIG. 3, after the display device is folded outward, a maximum distance H2 between the first support member 1 and the second support member 2 is about 10 mm, an outward folded shape of a smooth "U" shape with a radius R2 of about 5 mm is formed. Of course, the width of the limiting plane d and the width of the inclined surface b may also be set as required.

In an exemplary embodiment, the bonding plane a extends to the side away from the bending position to support the flexible display module 3. Since the structures of the first support member 1 and the second support member 2 may be exactly the same, the extension length of the bonding plane a of the first support structure 1 is the same as the extension length of the bonding plane a of the second support member 2.

Of course, in other exemplary embodiments of the present disclosure, the first mating surface 111 and the third mating surface 211 may be formed into a shape that completely matches the smooth water-drop shape that needs to be formed, so that when the display device is folded inward, the flexible display module 3 is fully attached to the first mating surface 111 and the third mating surface 211 to support the flexible display module 3. The structures of the first support member 1 and the second support member 2 may also be different. For example, the width of the first support member 1 and the width of the second support member 2 may not be the same, that is, the extension length of the bonding plane a of the first support member 1 is different from the extension length of the bonding plane a of the second support member 2, so that the bending position of the display device is not in the middle position. As long as the first mating surface 111 and the third mating surface 211 are symmetrically arranged, a smooth and symmetrical water-drop shape can be formed, thereby avoiding a display failure caused by uneven stresses of the flexible display module 3 and various functional layers when being folded inward.

Figure 4:
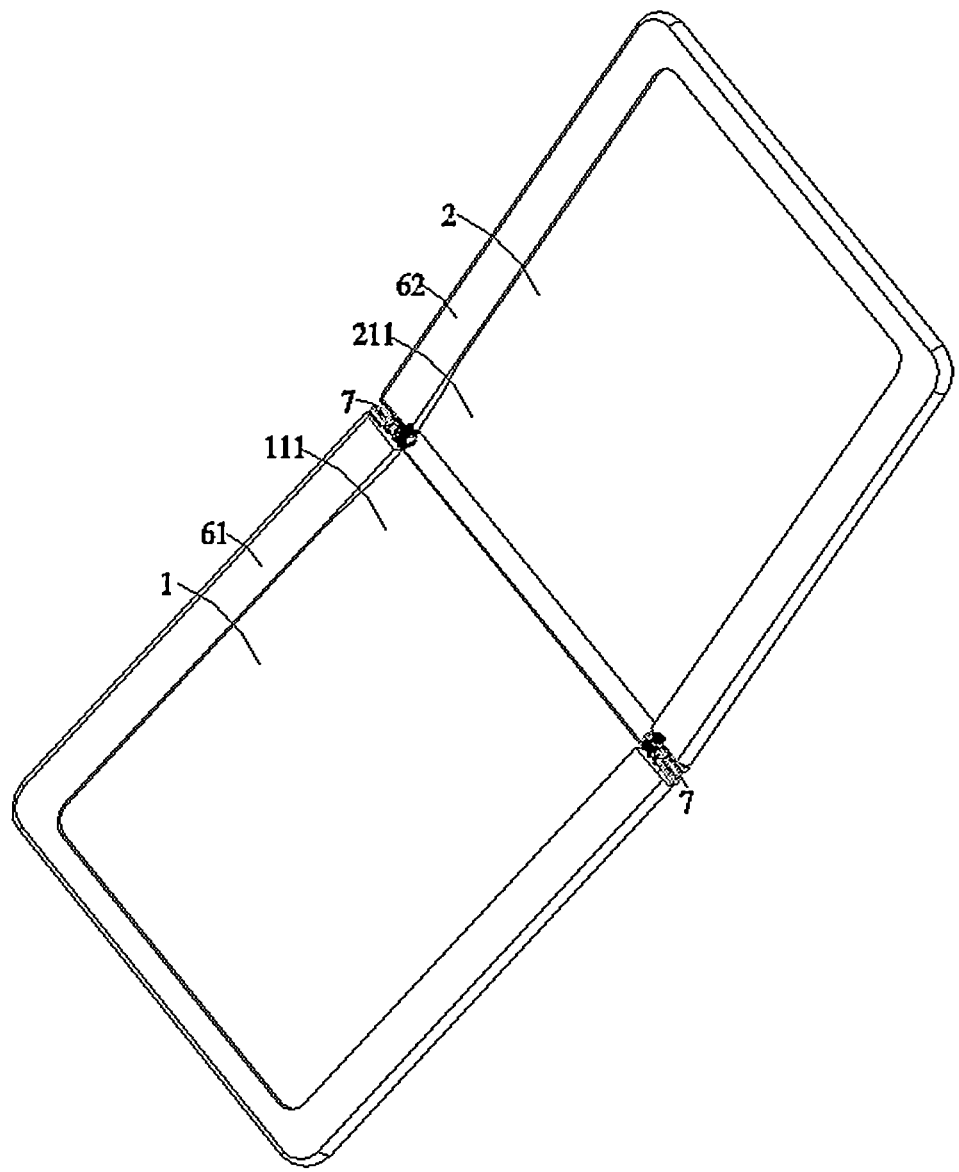
FIG. 4 is a schematic diagram of an overall structure of a first support member and a second support member in FIG. 1 after being connected.
Figure 5:
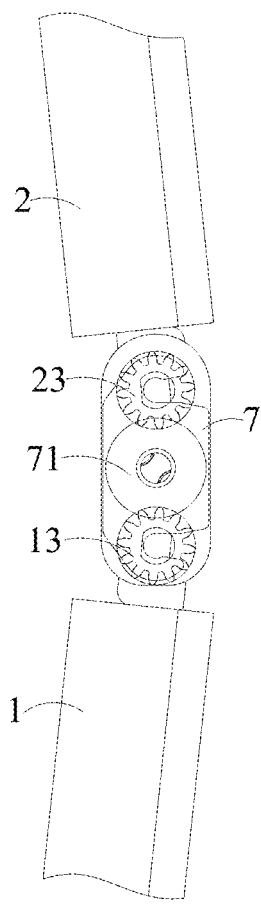
FIG. 5 is a schematic structural diagram of a connection between a first support member and a second support member in FIG. 4.

Referring to FIGS. 4 and 5, a first frame 61 is further arranged at the periphery of the first support member 1, and the first frame 61 surrounds the other three edges of the first support member 1 than the edge where the first mating surface 111 is arranged. Two ends of the first frame 61 protrude with respect to the first mating surface 111, the two ends of the first frame 61 protruding with respect to the first mating surface 111 are provided with two first fixing shafts in one-to-one correspondence, and a first gear 13 is provided on the first fixing shaft.

A second frame 62 is further arranged at the periphery of the second support member 2, and the second frame 62 surrounds the other three edges of the second support member 2 than the edge where the third mating surface 211 is arranged. Two ends of the second frame 62 protrude with respect to the third mating surface 211, the two ends of the second frame 62 protruding with respect to the third mating surface 211 are provided with two second fixing shafts in one-to-one correspondence, and a second gear 23 is provided on the second fixing shaft.

Referring to FIGS. 4 and 5, the display device further includes two connecting parts 7 having the same structure. The connecting part 7 includes at least one matching gear 71. The matching gear 71 is arranged between the first gear 13 and the second gear 23, and externally engages with the first gear 13 and the second gear 23, so that both the first support member 1 and the second support member 2 may rotate relative to the connecting part 7 to realize the inward or outward folding of the display device.

The specific structure of the flexible display module 3 will be described in detail below.

Figure 6:
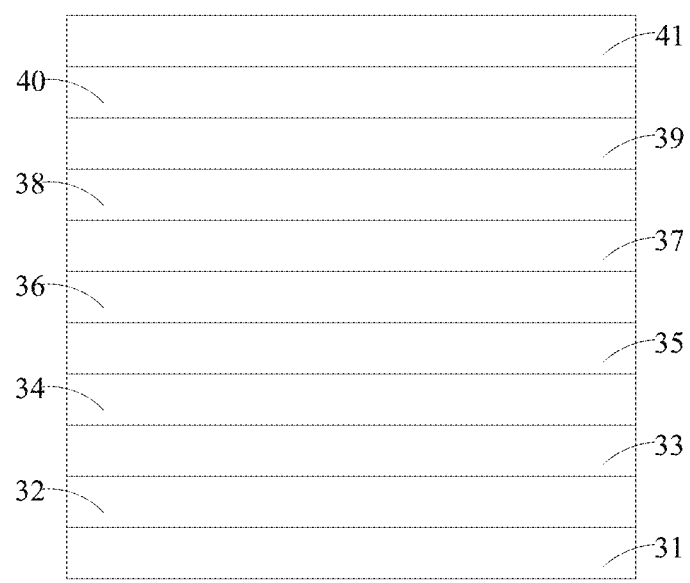
FIG. 6 is a schematic structural diagram of a flexible display module in FIG. 1 according to an exemplary embodiment.

Referring to FIG. 6, which shows a schematic structural diagram of the flexible display module 3 according to an exemplary embodiment of, the flexible display module 3 may include a flexible support plate 31, a protective layer 32, a backsheet layer 33, a first adhesive layer 34, and a flexible display panel 35, a second adhesive layer 36, a polarizer 37, a third adhesive layer 38, a first cover plate 39, a fourth adhesive layer 40 and a second cover plate 41.

The flexible support plate 31 is adhered to a part of the first surface 11 and a part of the third surface 21. The protective layer 32 is arranged on a side of the flexible support plate 31 away from the first support member 1 and the second support member 2; the backsheet layer 33 is arranged on a side of the protective layer 32 away from the flexible support plate 31; the first adhesive layer 34 is arranged on a side of the backsheet layer 33 away from the flexible support plate 31; the flexible display panel 35 is arranged on a side of the first adhesive layer 34 away from the flexible support plate 31; the second adhesive layer 36 is arranged on a side of the flexible display panel 35 away from the flexible support plate 31; the polarizer 37 is arranged on a side of the second adhesive layer 36 away from the flexible support plate 31; the third adhesive layer 38 is arranged on a side of the polarizer 37 away from the flexible support plate 31; the first cover plate 39 is arranged on a side of the third adhesive layer 38 away from the flexible support plate 31; the fourth adhesive layer 40 is arranged on a side of the first cover plate 39 away from the flexible support plate 31; the second cover plate 41 is arranged on a side of the fourth adhesive layer 40 away from the flexible support plate 31.

The positional relationship of each film layer of the flexible display module 3 is described above, and the thickness and performance requirements of each film layer are described below.

The flexible support plate 31 may be a metal support plate, a thickness of the flexible support plate 31 may be 150 μm±10 μm, and an equivalent elastic modulus thereof may be 10 Kpa±2 Kpa. The flexible support plate 31 provides support for the entire flexible display module 3.

A material of the protective layer 32 may be foam. The protective layer 32 may protect the backsheet layer 33. The protective layer 32 may prevent the flexible support plate 31 from damaging the backsheet layer 33. Adhesive layers are arranged on both sides of the protective layer 32 for bonding to the flexible support plate 31 and the backsheet layer 33.

A material of the backsheet layer 33 may be polyimide, a thickness of the backsheet layer 33 may be 23 μm±3 μm, and an elastic modulus of the backsheet layer 33 may be 3.2 GPa±0.5 GPa. The backsheet layer 33 may support and protect the flexible display panel 35.

A material of the first adhesive layer 34 may be OCA optical adhesive (Optically Clear Adhesive), and a thickness of the first adhesive layer 34 may be 15 μm±3 μm. When the temperature is 25° C., an elastic modulus of the first adhesive layer 34 is 45 KPa±10 Kpa; when the temperature is −20° C., the elastic modulus of the first adhesive layer 34 is 130 KPa±10 Kpa; when the temperature is 60° C., the elastic modulus of the first adhesive layer 34 is 40 KPa±5 KPa. The first adhesive layer 34 is used for bonding the flexible display panel 35 and the backsheet layer 33.

The OCA optical adhesive is a special adhesive for bonding transparent optical components (such as lenses). The OCA optical adhesive is required to have the characteristics such as being colorless and transparent, light transmittance above 90%, good bonding strength, being cured at a room temperature or medium temperature, and a small curing shrinkage. The OCA optical adhesive is a special double-sided adhesive tape of an optically transparent layer with no substrate.

The flexible display panel 35 may be an OLED (organic light emitting diode) display panel, a QLED (quantum dot light emitting diode) display panel or the like. The flexible display panel 35 may be any type of display panel that can be made flexible, and the specific structure of the display panel will not be repeated here.

A material of the second adhesive layer 36 may also be the OCA optical adhesive. A thickness of the second adhesive layer 36 may be 15 μm±5 μm. When the temperature is 25° C., an elastic modulus of the second adhesive layer 36 is 80 KPa±10 KPa; when the temperature is −20 At ° C., the elastic modulus of the second adhesive layer 36 is 130 KPa±10 Kpa; when the temperature is 65° C., the elastic modulus of the second adhesive layer 36 is 70 KPa±10 KPa. The second adhesive layer 36 is used for bonding the flexible display panel 35 and the polarizer 37.

A thickness of the polarizer 37 may be 45 μm±5 μm, and an elastic modulus of the polarizer 37 is 3.2 GPa±0.5 GPa. A basic structure of the polarizer 37 includes a middle PVA (polyvinyl alcohol) layer, two layers of TAC (triacetyl cellulose), a PSA (pressure sensitive adhesive) film, a release film and a protective film. The PVA layer plays the role of polarization. The PVA is easily hydrolyzed, and in order to protect the physical property of such polarizing film, TAC films with high light transmittance, good water resistance and certain mechanical strength are combined on both sides of the PVA respectively for protection, which forms the original plate of the polarizer 37.

A material of the third adhesive layer 38 may also be the OCA optical adhesive. A thickness of the third adhesive layer 38 may be 50 μm±5 μm. When the temperature is 25° C., an elastic modulus of the third adhesive layer 38 is 55 KPa±10 KPa; when the temperature is −20° C., the elastic modulus of the third adhesive layer 38 is 120 KPa±10 Kpa; when the temperature is 60° C., the elastic modulus of the third adhesive layer 38 is 35 KPa±5 KPa. A curing rate of the third adhesive layer 38 is 68%±3%. The third adhesive layer 38 is used for bonding the polarizer 37 and the first cover 39.

Thicknesses of the first cover plate 39 and the second cover plate 41 may both be 85 μm±5 μm. Materials of the first cover plate 39 and the second cover plate 41 may be polyimide or polyimide and PET (polyethylene terephthalate). The fourth adhesive layer 40 is used for bonding the first cover plate 39 and the second cover plate 41. Two layers of cover plates (the first cover plate 39 and the second cover plate 41) may increase the scratch resistance and impact resistance of the display device, and prevent scratches and impacts from damaging each functional layer when the display device is folded outward.

In a second exemplary embodiment of the present disclosure, the thickness of the third adhesive layer 38 may be adjusted while keeping other conditions unchanged. Specifically, the material of the third adhesive layer 38 may also be the OCA optical adhesive. The thickness of the second adhesive layer 36 may be 100 μm±10 μm. When the temperature is 25° C., the elastic modulus of the third adhesive layer 38 is 55 KPa±10 KPa; when the temperature is −20° C., the elastic modulus of the third adhesive layer 38 is 120 KPa±10 Kpa; when the temperature is 60° C., the elastic modulus of the third adhesive layer 38 is 35 KPa±5 KPa. The curing rate of the third adhesive layer 38 is 68%±3%.

In a third exemplary embodiment of the present disclosure, the elastic modulus of the third adhesive layer 38 may be adjusted while keeping other conditions unchanged. Specifically, the material of the third adhesive layer 38 may also be the OCA optical adhesive, the thickness of the second adhesive layer 36 may be 50 μm±5 μm. The elastic modulus of the third adhesive layer 38 is 140 KPa±10 KPa when the temperature is 25° C. The curing rate of the third adhesive layer 38 is 68%±3%.

In a fourth exemplary embodiment of the present disclosure, the thickness of the polarizer 37 may be adjusted while keeping other conditions unchanged. Specifically, the thickness of the polarizer 37 may be 90 μm±10 μm, and the elastic modulus of the polarizer 37 is 3.2 GPa±0.5 GPa.

In a fifth exemplary embodiment of the present disclosure, the elastic modulus of the backsheet layer 33 may be adjusted while keeping other conditions unchanged. Specifically, the material of the backsheet layer 33 may be polyimide, the thickness of backsheet layer 33 may be 23 µm±3 µm, and the elastic modulus of the backsheet layer 33 is 9 GPa±1 Gpa.

The various film layers in the above exemplary embodiment are matched with each other, and are obtained through countless experiments.

Figure 7:
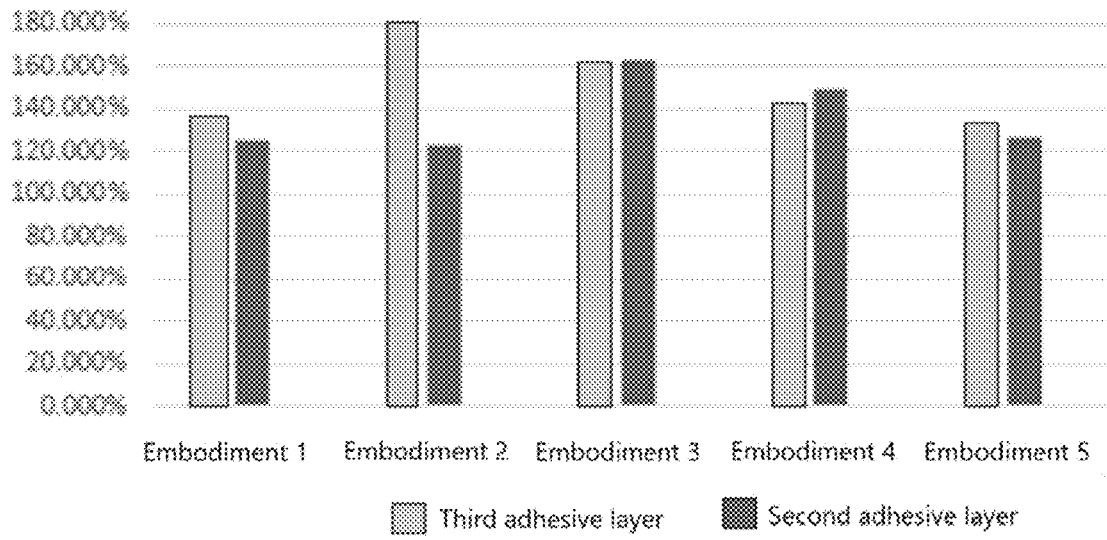
FIG. 7 is a schematic diagram of a strain finite element simulation of a second adhesive layer and a third adhesive layer in FIG. 6.
Figure 8:
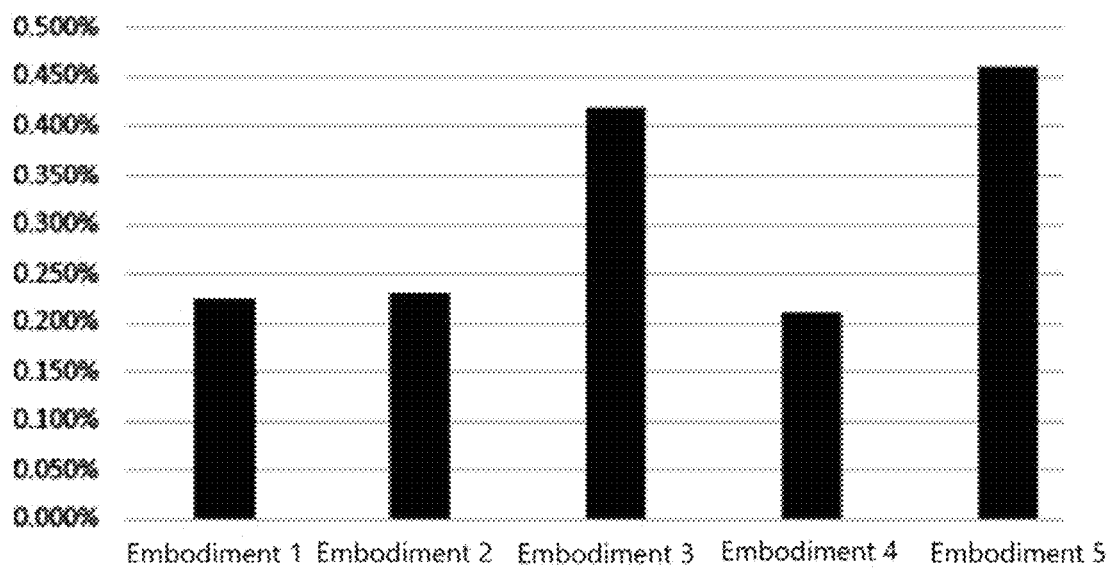
FIG. 8 is a schematic diagram of strain finite element simulation of a flexible display panel in FIG. 6.

FIG. 7 shows a finite element simulation schematic diagram of a strain of the second adhesive layer 36 and the third adhesive layer 38 in which the ordinate is a strain amount, and FIG. 8 shows a finite element simulation schematic diagram of a strain of the flexible display panel 35 in which the ordinate is a strain amount. The strain amount in the figure is the maximum strain in the process that the display device changes from the inward folding state to the outward folding state. The comparison of the following data is a comparison of each exemplary embodiment with the first exemplary embodiment.

It can be seen from the drawings that in the first exemplary embodiment, the strain of the second adhesive layer 36 is approximately 124%, the strain of the third adhesive layer 38 is approximately 136%, the strain of the flexible display panel 35 is approximately 0.225%, and the strains of the flexible display panel 35, the second adhesive layer 36 and the third adhesive layer 38 are all relatively small. In the second exemplary embodiment, the strain of the second adhesive layer 36 is slightly reduced to about 122%, however, the strain of the third adhesive layer 38 is increased greatly to about 180%, and the strain of the flexible display panel 35 is increased slightly to about 0.23%. In the third exemplary embodiment, the strain of the second adhesive layer 36 is increased greatly to about 162%, the strain of the third adhesive layer 38 is increased greatly to about 160%, and the strain of the flexible display panel 35 is increased greatly to about 0.42%. In the fourth exemplary embodiment, the strain of the second adhesive layer 36 is slightly increased to approximately 148%, the strain of the third adhesive layer 38 is slightly increased to approximately 142%, and the strain of the flexible display panel 35 is slightly reduced to about 0.21%. In the fifth exemplary embodiment, the strain of the second adhesive layer 36 remains basically unchanged, the strain of the third adhesive layer 38 is slightly reduced to about 134%, the strain of the flexible display panel 35 is increased greatly to about 0.46%.

Therefore, it can be seen from the above comparison that the first exemplary embodiment is the best, the second and fourth exemplary embodiments are the second-best, and the third and fifth exemplary embodiments are the third-best. However, the strain of each film layer in the above five exemplary embodiments is smaller than the strain of the corresponding film layer in the prior art. In the experiment, the strains of the second adhesive layer 36 and the third adhesive layer 38 in the prior art are greater than 200%, and the strain of the flexible display panel is greater than 0.5%.

Figure 9:
FIG. 9 is a schematic structural diagram of a flexible display module in FIG. 1 according to another exemplary embodiment.

Referring to FIG. 9, in another exemplary embodiment of the present disclosure, the fourth adhesive layer 40 and the second cover plate 41 may not be provided.

The features, structures, or characteristics described above may be combined in one or more embodiments in any suitable manner. If possible, the features discussed in the embodiments are interchangeable. In the above description, many specific details are provided to provide a sufficient understanding of the embodiments of the present disclosure. However, those skilled in the art will realize that the technical solutions of the present disclosure may be practiced without one or more of the specific details, or by using other methods, components, material. In other cases, well-known structures, materials, or operations are not shown or described in detail to avoid obscuring aspects of the present disclosure.

The terms "about" and "approximately" used in the specification usually means within 20% of a given value or range, optionally within 10%, and optionally within 5%. The quantity given herein is an approximate quantity, which means "about", "approximately", "substantially", and "around" in the absence of specific instructions.

Although relative terms such as "upper" and "lower" are used in this specification to describe the relative relationship between one component and another component shown, these terms are used in this specification only for convenience of description, for example, according to the direction shown in the drawings. It can be understood that if the device shown is turned upside down, the components described as "upper" will become the "lower" components. Other relative terms, such as "high", "low", "top", and "bottom" have similar meanings. When a structure is "on" another structure, it may mean that a certain structure is integrally formed on another structure, or that a certain structure is "directly" disposed on another structure, or that a certain structure is "indirectly" disposed on another structure through another structure.

In this specification, the terms "a", "an", "the", "said", and "at least one" are used to indicate that there are one or more elements/components/etc.; the terms "including", "comprising" and "having" are used to mean open-ended inclusion and means that in addition to the listed elements/components/etc., there may be additional elements/components/etc.; the terms "first" and "second" and "third" are only used as markers, and are not a limitation on the number of objects.

It should be understood that the present disclosure is not limited to the detailed structure and arrangement of the components provided in this specification. The present disclosure have other embodiments, and may be implemented and executed in various ways. The aforementioned changes and modifications fall within the scope of the present disclosure. It should be understood that the present disclosure disclosed and defined in this specification extends to all alternative combinations of two or more individual features mentioned or readily apparent in the text and/or drawings. All these different combinations constitute a plurality of alternative aspects of the present disclosure. The embodiments described in this specification illustrate the best implementation for the present disclosure, and will enable those skilled in the art to utilize the present disclosure.

What is claimed is:

1. A display device, comprising:
a first support member having a first surface and a second surface that are arranged oppositely;
a second support member having a gap with the first support member, and having a third surface and a fourth surface that are arranged oppositely; and
a flexible display module arranged on the first surface of the first support member and the third surface of the second support member, wherein:
the first surface comprises a first mating surface close to the second support member, the third surface comprises a third mating surface close to the first support member, and the first mating surface and the third mating surface are arranged symmetrically to each other; and a distance from at least part of the first mating surface to the flexible display module increases as a distance from the at least part of the first mating surface to the second support member decreases, and a distance from at least part of the third mating surface to the flexible display module increases as a distance from the at least part of the third mating surface to the first support member decreases, so that when the display device is folded inward, the flexible display module contacts with the at least part of the first mating surface and the at least part of the third mating surface to form a water-drop shape, wherein the flexible display module comprises:
a flexible support plate bonded to a part of the first surface and a part of the third surface;
a protective layer arranged on a side of the flexible support plate away from the first support member and the second support member;
a backsheet layer arranged on a side of the protective layer away from the flexible support plate;
a first adhesive layer arranged on a side of the backsheet layer away from the flexible support plate;
a flexible display panel arranged on a side of the first adhesive layer away from the flexible support plate;
a second adhesive layer arranged on a side of the flexible display panel away from the flexible support plate;
a polarizer arranged on a side of the second adhesive layer away from the flexible support plate;
a third adhesive layer arranged on a side of the polarizer away from the flexible support plate; and
a first cover plate arranged on a side of the third adhesive layer away from the flexible support plate.

2. The display device according to claim 1, wherein the first mating surface and the third mating surface each comprises:
a bonding plane on which the flexible display module is bonded;
an inclined surface connected with the bonding plane and having a smooth transition with the bonding plane; and
a limiting plane connected with the inclined surface and arranged in parallel with the bonding plane,
wherein the inclined surface is inclined from the bonding plane to the limiting plane to a side away from the flexible display module, the inclined surface transitions to the limiting plane through at least one curved surface protruding to the flexible display module, and the inclined surface is coplanar with a tangent plane of the curved surface, so that when the display device is folded inward, the flexible display module contacts the curved surface and the limiting plane to form the water-drop shape.

3. The display device according to claim 2, wherein an inclination angle of the inclined surface is greater than or equal to 10 degrees and less than or equal to 20 degrees, a width of the limiting plane is greater than or equal to 5 mm and less than or equal to 7 mm, and a sum of the width of the limiting plane and a width of the inclined surface is greater than or equal to 13 mm and less than or equal to 15 mm.

4. The display device according to claim 1, wherein a thickness of the flexible support plate is greater than or equal to 140 μm and less than or equal to 160 μm, and an equivalent elastic modulus of the flexible support plate is greater than or equal to 8 Kpa and less than or equal to 12 Kpa.

5. The display device according to claim 4, wherein a material of the first adhesive layer is OCA optical adhesive, a thickness of the first adhesive layer is greater than or equal to 12 μm and less than or equal to 18 μm, and an elastic modulus of the first adhesive layer is greater than or equal to 35 KPa and less than or equal to 55 Kpa at a temperature of 25° C., greater than or equal to 120 KPa and less than or equal to 140 Kpa at a temperature of −20° C., and greater than or equal to 35 KPa and less than or equal to 45 KPa at a temperature of 60° C.

6. The display device according to claim 5, wherein a material of the second adhesive layer is the OCA optical adhesive, a thickness of the second adhesive layer is greater than or equal to 10 μm and less than or equal to 20 μm, and an elastic modulus of the second adhesive layer is greater than or equal to 70 KPa and less than or equal to 90 Kpa at a temperature of 25° C., greater than or equal to 120 KPa and less than or equal to 140 Kpa at a temperature of −20° C., and greater than or equal to 60 KPa and less than or equal to 80 KPa at a temperature of 65° C.

7. The display device according to claim 6, wherein a thickness of the first cover plate is greater than or equal to 80 μm and less than or equal to 90 μm.

8. The display device according to claim 7, wherein a thickness of the polarizer is greater than or equal to 40 μm and less than or equal to 50 μm, and an elastic modulus of the polarizer is greater than or equal to 2.7 GPa and less than or equal to 3.7 GPa.

9. The display device according to claim 8, wherein a thickness of the backsheet layer is greater than or equal to 20 μm and less than or equal to 26 μm, and an elastic modulus of the backsheet layer is greater than or equal to 2.7 GPa and less than or equal to 3.7 GPa.

10. The display device according to claim 9, wherein:
a material of the third adhesive layer is the OCA optical adhesive, a curing rate of the third adhesive layer is greater than or equal to 65% and less than or equal to 71%, a thickness of the third adhesive layer is greater than or equal to 45 μm and less than or equal to 55 μm, and an elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.; or
the material of the third adhesive layer is the OCA optical adhesive, the curing rate of the third adhesive layer is greater than or equal to 65% and less than or equal to 71%, the thickness of the third adhesive layer is greater than or equal to 90 μm and less than or equal to 110 μm, and the elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.; or
the material of the third adhesive layer is the OCA optical adhesive, the curing rate of the third adhesive layer is greater than or equal to 65% and less than or equal to 71%, the thickness of the third adhesive layer is greater than or equal to 45 μm and less than or equal to 55 μm, and the elastic modulus of the third adhesive layer is greater than or equal to 130 KPa and less than or equal to 150 KPa at a temperature of 25° C.

11. The display device according to claim 8, wherein:
a thickness of the backsheet layer is greater than or equal to 20 μm and less than or equal to 26 μm, and an elastic modulus of the backsheet layer is greater than or equal to 8 GPa and less than or equal to 10 GPa; and a material of the third adhesive layer is the OCA optical adhesive, a curing rate of the third adhesive layer is greater than or equal to 65% and less than or equal to 71%, a thickness of the third adhesive layer is greater than or equal to 45 μm and less than or equal to 55 μm, and an elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.

12. The display device according to claim 7, wherein:

a thickness of the polarizer is greater than or equal to 80 μm and less than or equal to 100 μm, and an elastic modulus of the polarizer is greater than or equal to 2.7 GPa and less than or equal to 3.7 Gpa;

a thickness of the backsheet layer is greater than or equal to 20 μm and less than or equal to 26 μm, and an elastic modulus of the backsheet layer is greater than or equal to 2.7 GPa and less than or equal to 3.7 GPa; and a material of the third adhesive layer is the OCA optical adhesive, a curing rate of the third adhesive layer is greater than or equal to 65% and less than or equal to 71%, a thickness of the third adhesive layer is greater than or equal to 45 μm and less than or equal to 55 μm, and an elastic modulus of the third adhesive layer is greater than or equal to 45 KPa and less than or equal to 65 KPa at a temperature of 25° C., greater than or equal to 110 KPa and less than or equal to 130 Kpa at a temperature of −20° C., and greater than or equal to 30 KPa and less than or equal to 40 Kpa at a temperature of 60° C.

13. The display device according to claim 1, wherein the flexible display module further comprises:

a fourth adhesive layer arranged on a side of the first cover plate away from the flexible support plate; and a second cover plate arranged on a side of the fourth adhesive layer away from the flexible support plate.

14. The display device according to claim 13, wherein a thickness of the second cover plate is greater than or equal to 80 μm and less than or equal to 90 μm.

\* \* \* \* \*